C. G. TROSIEN.
AUTOMOBILE LOCK.
APPLICATION FILED JAN. 19, 1918.
1,361,784.
Patented Dec. 7, 1920.
2 SHEETS—SHEET 1.
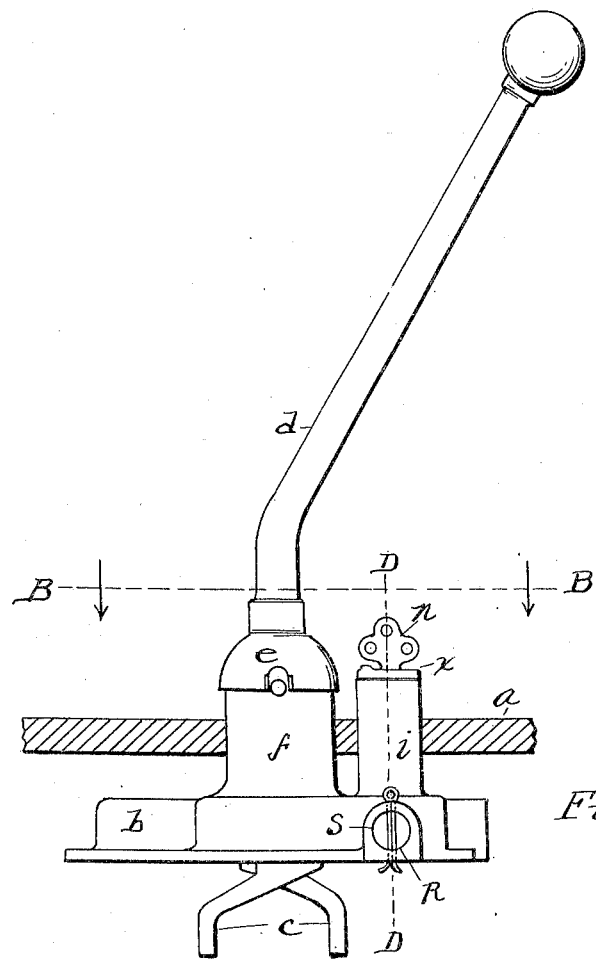
Fig. 1.
Fig. 2.
Inventor
CHARLES G. TROSIEN.
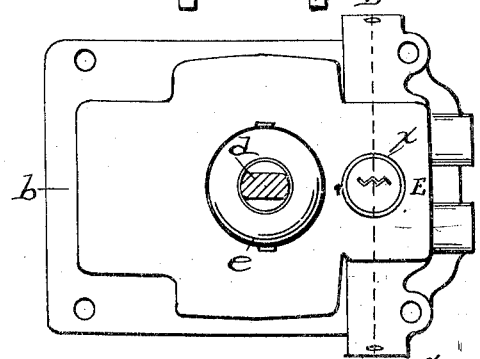
Attorney

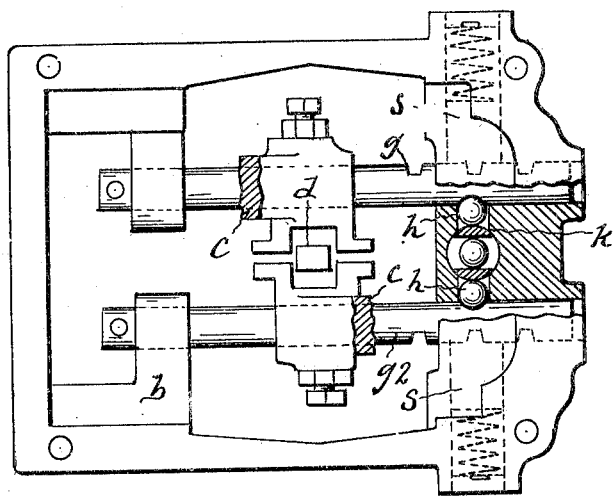
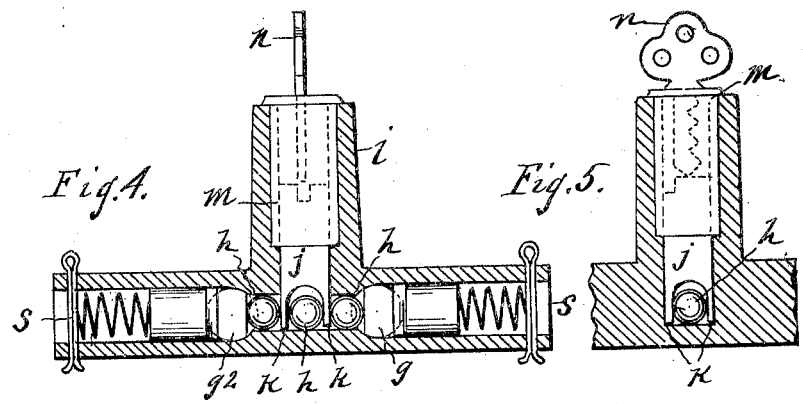
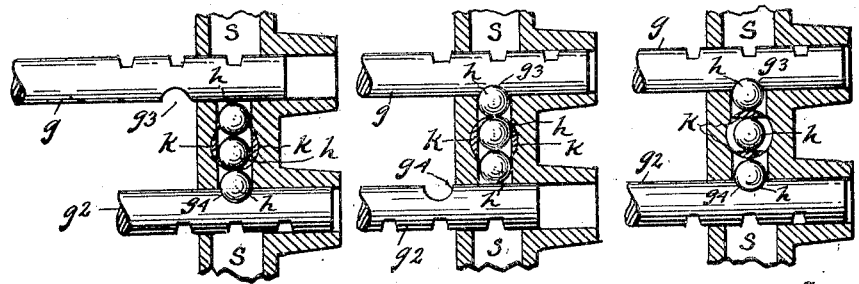

UNITED STATES PATENT OFFICE.

CHARLES G. TROSIEN, OF PONTIAC, MICHIGAN.

AUTOMOBILE-LOCK.

1,361,784. Specification of Letters Patent. Patented Dec. 7, 1920.

Original application filed February 11, 1918, Serial No. 216,493. Divided and this application filed January 19, 1918. Serial No. 212,577.

*To all whom it may concern:*

Be it known that I, CHARLES G. TROSIEN, a citizen of the United States, residing at Pontiac, county of Oakland, State of Michigan, have invented a certain new and useful Improvement in Automobile-Locks, and declare the following to be a full, clear, and exact description of the same, such as will enable others skilled in the art to which it pertains to make and use the same, reference being had to the accompanying drawings, which form a part of this specification.

My invention relates to automobile locks and an object of my improvements is to provide a lock which is readily applicable to existing forms of automobiles at a small expense and which shall be simple, accessible, and which shall not occupy room that is required for other purposes.

I secure this object by the device illustrated in the accompanying drawings in which, Figure 1 is a side elevation partly in section of an apparatus embodying my invention and so much of an automobile as is necessary to show its connection therewith.

Fig. 2 is a plan view partly in section on the line B—B Fig. 1, the part of the floor shown in Fig. 1 being omitted.

Fig. 3 is an inverted plan view of the parts shown in Fig. 2.

Fig. 4 is a section on the line D—D Figs. 1 and 2.

Fig. 5 is a partial section on the line E—E Fig. 2.

Fig. 6 is a horizontal section of the portion of the casing between the longitudinally sliding rods which carry the gear shifting forks of the change speed gearing showing a portion of said rods, the balls extending in an aperture therebetween and the lower end of the locking spindle.

Figs. 7 and 8 are views similar to Fig. 6 showing the parts in a different position.

The present application constitutes a division of my application patented in the United States, No. 1,280,589.

$a$ is the floor of the automobile, $b$ is the cover or upper portion of the change speed gearing, and $c$ $c$ are the gear shifting forks. $f$ is a cylindrical upward projection from the cover $b$, having a ball and socket joint $e$ at its upper end. $d$ is a gear shifting lever extending through the ball and socket joint $e$ to operate the sliding rods in the usual way in selective change speed gearings. $g$ $g^2$ are the usual longitudinal reciprocating rods carrying the forks $c$. There is an aperture $s$ formed through the cover $b$ transverse thereof, its axis being in the same plane and transverse to the axes of the bearings in which the rods $g$ $g^2$ slide. The rods $g$ $g^2$ are provided on adjacent sides with notches $g^3$ and $g^4$. $h$ $h$ $h$ are balls inserted in the aperture $s$ between the rods $g$ and $g^2$. The distance of the rods apart and the size of the balls $h$ are such that if one of the balls is in a notch $g^3$ or $g^4$ the ball adjacent to the other rod will permit said other rod to pass by it. Thus if one of the rods $g$ or $g^2$ is moved, say to the position shown in Fig. 7, the other rod will be locked in its neutral position by a ball entering the notch $g^3$ and held therein by the displaced rod and intermediate balls, or if the other rod $g$ is moved from its neutral position the rod $g^2$ will be locked as shown in Fig. 8. Thus either of said rods may be moved from the neutral position but not both.

The above described construction is old and is generally embodied in automobiles as now constructed.

To provide a lock embodying my invention I preferably form the cover $b$ with a cylindrical projection $i$ which passes through the floor $a$ so that its upper end shall be readily accessible. This projection is directly above the center ball $h$ and the axis of its bore cuts the axis of the aperture $s$ at right angles and at the center thereof. In the bore of the projection $i$ I fit a rotatable rod $m$ having branches $k$ at its lower end forming a fork which is of such a size as to extend over the center ball $h$, as shown for instance in Figs. 4 and 5. When the rod $m$ is turned so that its forks are at the side of the line of balls $h$ $h$ $h$ as shown in Figs. 7 and 8 the balls are free to act in the usual way. When said rod is turned at right angles to said position the forks $k$ $k$ are interposed between the center and end balls and thus the end balls are forced and held in both of the apertures $g^3$ and $g^4$. This can only occur when the two rods $q$ and $g^2$ are in the neutral position of the change speed gearing and in this position with the rod $m$ turned to interpose the forks $k$ $k$ between the balls the two rods $g$ $g^2$ are immovably locked in neutral position.

The upper end of the rod $j$ is provided with a locking arrangement which may be of the pin lock kind having the key $n$. The key hole is in the upper end of the projection $j$ and may be provided with a removable cover $x$ as shown in Fig. 1 to prevent dirt getting into the key hole.

Thus to lock the automobile the driver takes the key $n$ inserts it in the key-hole at the upper end of the projection $i$ and turns the rod $m$ to the locking position shown in Figs. 3 and 6 when the transmission mechanism is disconnected. When it is desired to use the automobile the rod $m$ is again turned by the key $n$ to the position to allow the key action of the balls $h$.

What I claim is:

1. In an apparatus of the kind described, two reciprocating rods adapted to throw the mechanism in and out of engagement, a plurality of reciprocating parts located between said rods and adapted to engage either one of said rods leaving the other free, a locking rod unconnected with any one of said parts adapted to rotate about its axis and extending at right angles to the plurality of parts between said reciprocating rods, said rod being provided with an eccentric lug integral with said rod which is inserted between two of said parts by the turning of said locking rod thus forcing said parts into locking engagement with both of said reciprocating rods.

2. In an apparatus of the kind described, two reciprocating rods adapted to throw the mechanism in and out of engagement, a plurality of balls, located between said rods and adapted to engage either one of said rods leaving the other free, a locking rod adapted to rotate about its axis and extending at right angles to the plurality of parts between said reciprocating rods, said rod being forked at its lower end and extending over an intermediate ball so that when the locking rod is turned the branches of the fork shall come between the balls thus locking both of said reciprocating rods.

3. In a change speed gearing, two parallel reciprocating rods adapted to throw the mechanism in and out of engagement, an inclosed passage extending between said rods in approximately the axial plane thereof, a plurality of reciprocating parts located in said passage between said rods, said rods being provided with concavities opposite and adjacent to the ends of said passage when the rods are in their neutral position, a locking rod extending in a plane at right angles to said passage and adapted to turn about its axis and extending into said passage, and a cam on the end of said rod in said passage adapted to be interposed between said reciprocating parts when the rod is turned to force one of said parts into each of said concavities and to be withdrawn from between said parts when turned about its axis to another position for the purpose described.

In testimony whereof I sign this specification.

CHARLES G. TROSIEN.